(12) United States Patent
Mannell et al.

(10) Patent No.: US 6,467,851 B1
(45) Date of Patent: Oct. 22, 2002

(54) SAFETY HARNESS

(75) Inventors: Catherine A. Mannell, Parkville, MO (US); Michael C. Greenwood, Shawnee, KS (US)

(73) Assignee: Little Cliffies, L.L.C., Parkville, MO (US)

( * ) Notice: Subject to any disclaimer, the term of this patent is extended or adjusted under 35 U.S.C. 154(b) by 3 days.

(21) Appl. No.: 09/642,422

(22) Filed: Aug. 21, 2000

(51) Int. Cl.[7] .............................................. A47D 13/08
(52) U.S. Cl. ........................ 297/484; 297/485; 119/770
(58) Field of Search ................................ 297/467, 484, 297/485; 119/770, 771, 907; 128/875

(56) References Cited

U.S. PATENT DOCUMENTS

| 2,979,028 A | | 4/1961 | Zakely |
| 3,480,325 A | | 11/1969 | Kramer |
| 3,954,280 A | * | 5/1976 | Roberts et al. ............. 297/485 |
| 4,488,691 A | | 12/1984 | Lorch |
| 4,540,218 A | | 9/1985 | Thomas |
| 4,618,186 A | | 10/1986 | Swanson |
| 4,758,048 A | | 7/1988 | Shuman |
| 4,927,211 A | * | 5/1990 | Bolcerek .................... 297/484 |
| 5,435,272 A | * | 7/1995 | Epstein ...................... 297/484 |
| 5,540,403 A | | 7/1996 | Standley |
| 5,628,548 A | | 5/1997 | Lacoste |
| 5,836,656 A | | 11/1998 | Baggott |
| 5,909,927 A | | 6/1999 | Henshall |
| 5,957,091 A | * | 9/1999 | McDonald et al. ......... 119/770 |

* cited by examiner

Primary Examiner—Peter R. Brown
(74) Attorney, Agent, or Firm—Hovey Williams LLP

(57) ABSTRACT

An improved harness (10) adapted to be worn by a person (12) preferably includes a continuous, unitary, non-segmented strap (34) which is threaded through an anchor member (36), side buckles (38, 40) and buckle connectors (78) to provide a harness allowing the person (12) to be secured by a standard safety belt (112). The harness presents first and second strap segments (96, 98) coupled to the anchor member (36) and extending over the shoulders (20, 22) of the person (12) and thence downwardly in crossing relationship to side buckles (38, 40) defining juncture regions (100, 102). The strap (34) is then extended rearwardly and threaded through the anchor member (36) to present third and fourth strap segments (104, 106). Finally, the strap (34) is extended downwardly from the side buckles (38, 40) and through the crotch (26) of the person upwardly for connection at the side buckles (38, 40) via buckle connectors (78). In alternate forms, the harness (10) can include separate, individual segments (96, 98, 104, 106, 108, and 110) which are interconnected.

6 Claims, 2 Drawing Sheets

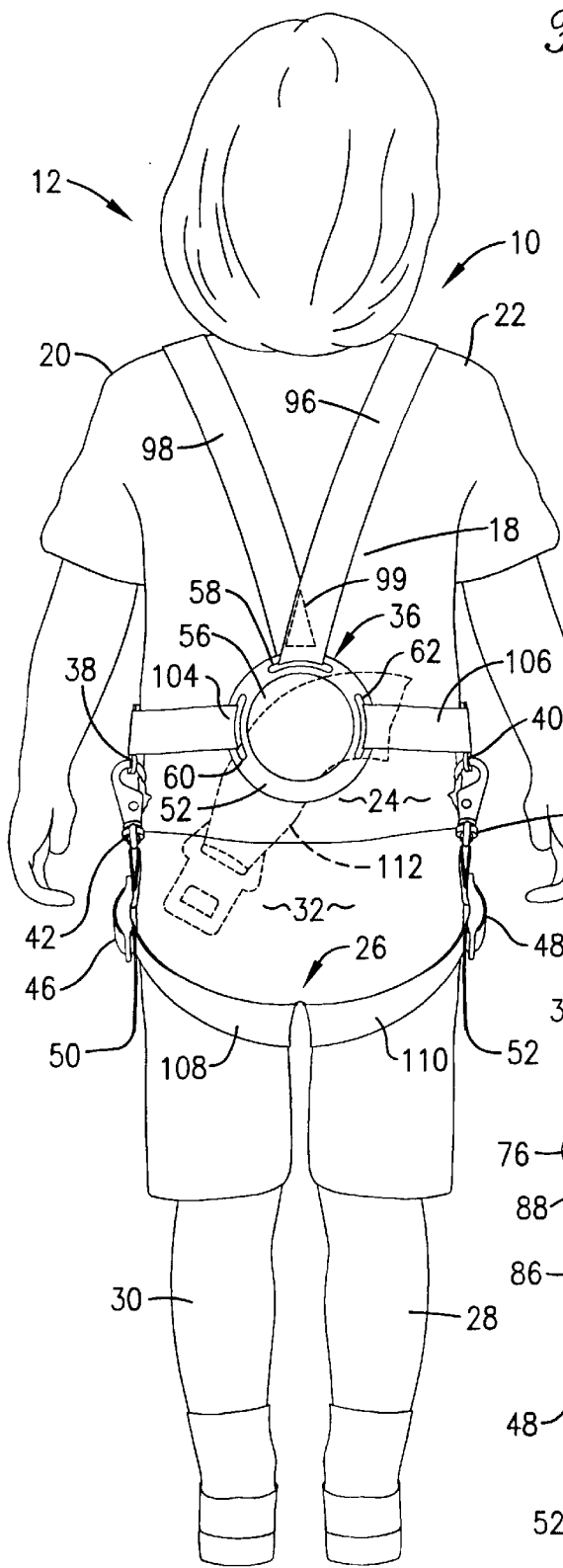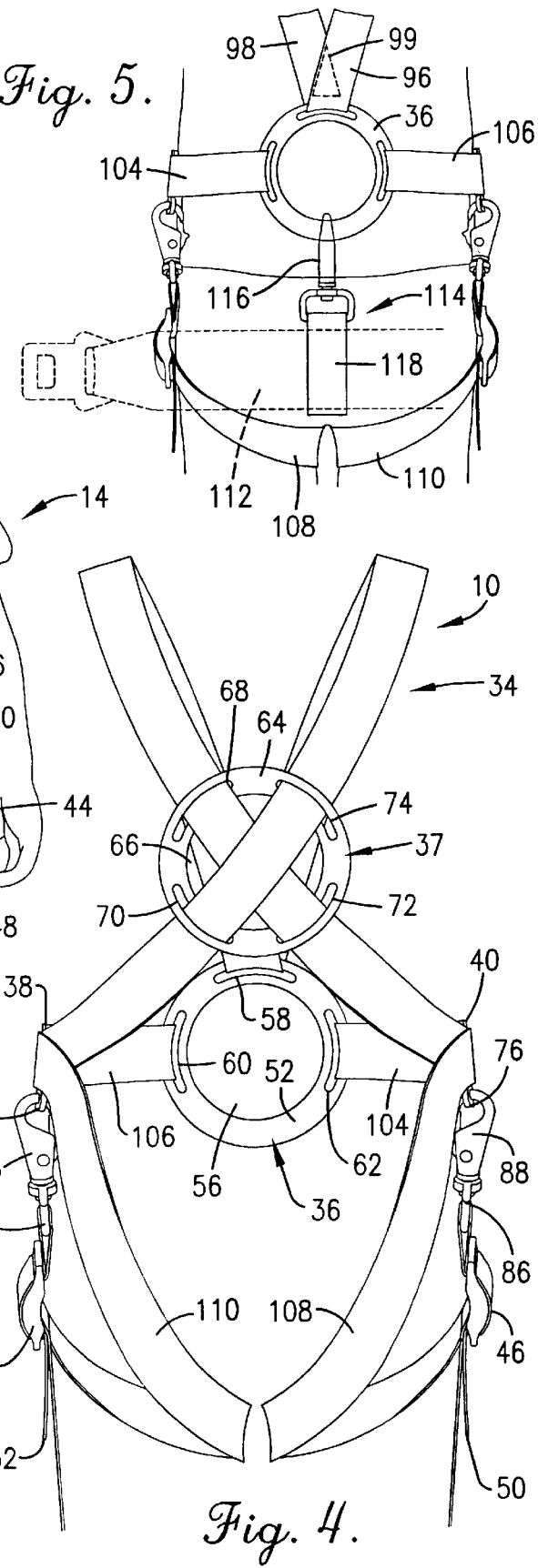

SAFETY HARNESS

BACKGROUND OF THE INVENTION

1. Field of the Invention

The present invention is broadly concerned with an improved harness assembly which can be worn by a person to allow the person to be otherwise secured via a seatbelt or other means. More particularly, the invention pertains to such harnesses which are preferably formed using a single continuous strap and appropriate connection/adjustment hardware. The harnesses of the invention can be used for children when on a parent's lap in an automobile or airplane, or for medical patients who need to be securely restrained during transport.

2. Description of the Prior Art

A variety of harness restraints for children or adults have been developed in the past. For example, U.S. Pat. No. 2,979,028 describes a body harness used in a rescue situation in order to allow a person to be hoisted from a hazardous location. This harness includes straps which pass under the arms and legs of a person and are interconnected by a vertical strap. A hoist point at the upper end of the harness allows a person to be hoisted as necessary from a dangerous locale or because of injury. However, the harness of the '028 patent is designed primarily for emergency situations and would not be comfortable to wear on a regular basis or for long, periods of time.

Additional harnesses are shown in U.S. Pat. Nos. 5,836,656, 5,628,548, 5,540,403, 4,488,691, 5,909,927, 4,618,186, 4,540,218, 3,480,325, and 4,758,048. However, to the extent that these harnesses provide adequate restraint and support for a person, they suffer from problems of excessive structural complexity and difficulty in donning the harnesses. On the other hand, the more simple harnesses of the prior art do not provide sufficient restraint.

One problem of particular interest to parents is that of safely securing a child in a parent's lap during aircraft travel. Many airlines permit infants and small children to sit on a parent's lap during travel. However, in the event of an emergency or during adverse weather, the child may not be adequately restrained. The simple expedient of extending the parent's seat belt to encompass the child is not recommended, because these seatbelts are not designed for this purpose, and in fact the practice is not legal for air travel. A number of the aforementioned patents address this problem, but not in any satisfactory way.

There is accordingly a need in the art for a simplified, low-cost harness assembly which can be readily placed on a person and which provides support for essentially the entire trunk of the person while also permitting ready attachment of conventional standard seatbelts to the harness.

SUMMARY OF THE INVENTION

The present invention overcomes the problems outlined above and provides an improved harness assembly adapted to be worn on a person's trunk. Broadly speaking, the harness of the invention includes an anchor member adapted to be placed adjacent either the person's trunk front or back, together with first and second strap segments coupled with the anchor member and extending upwardly over the person's shoulders and then downwardly in crossing relationship adjacent the other side of the person's trunk opposite the anchor member to respective juncture regions on opposite sides of the person's trunk. Third and fourth strap segments are operatively coupled with the first and second segments at the juncture regions, with the third and fourth segments extending to and operatively coupled with the anchor member. Finally, fifth and sixth strap segments are also operatively coupled to the first and second segments at the respective juncture regions, with the fifth and sixth strap segments extending downwardly through the person's crotch and then upwardly for connection thereof at the juncture regions.

In preferred forms, the harness is made up of only a single, unitary, non-segmented strap. The strap is threaded through the anchor member and supports side buckles which define the aforementioned juncture regions, with the fifth and sixth segments extending through the person's crotch and upwardly for connection to the side buckles. The fifth and sixth segments are also equipped with adjustment buckles allowing proper fit of the harness onto the person.

BRIEF DESCRIPTION OF THE DRAWINGS

FIG. 3 is a rear elevational view of the person wearing the preferred harness, and illustrating in phantom the attachment of a standard safety belt to the harness;

FIG. 4 is a front elevational view of the harness; and

FIG. 5 is a fragmentary rear view of the harness on a person, illustrating the use of a coupler secured to the harness and adapted to receive a standard safety belt.

DETAILED DESCRIPTION OF THE PREFERRED EMBODIMENT

Figures 1, 2:
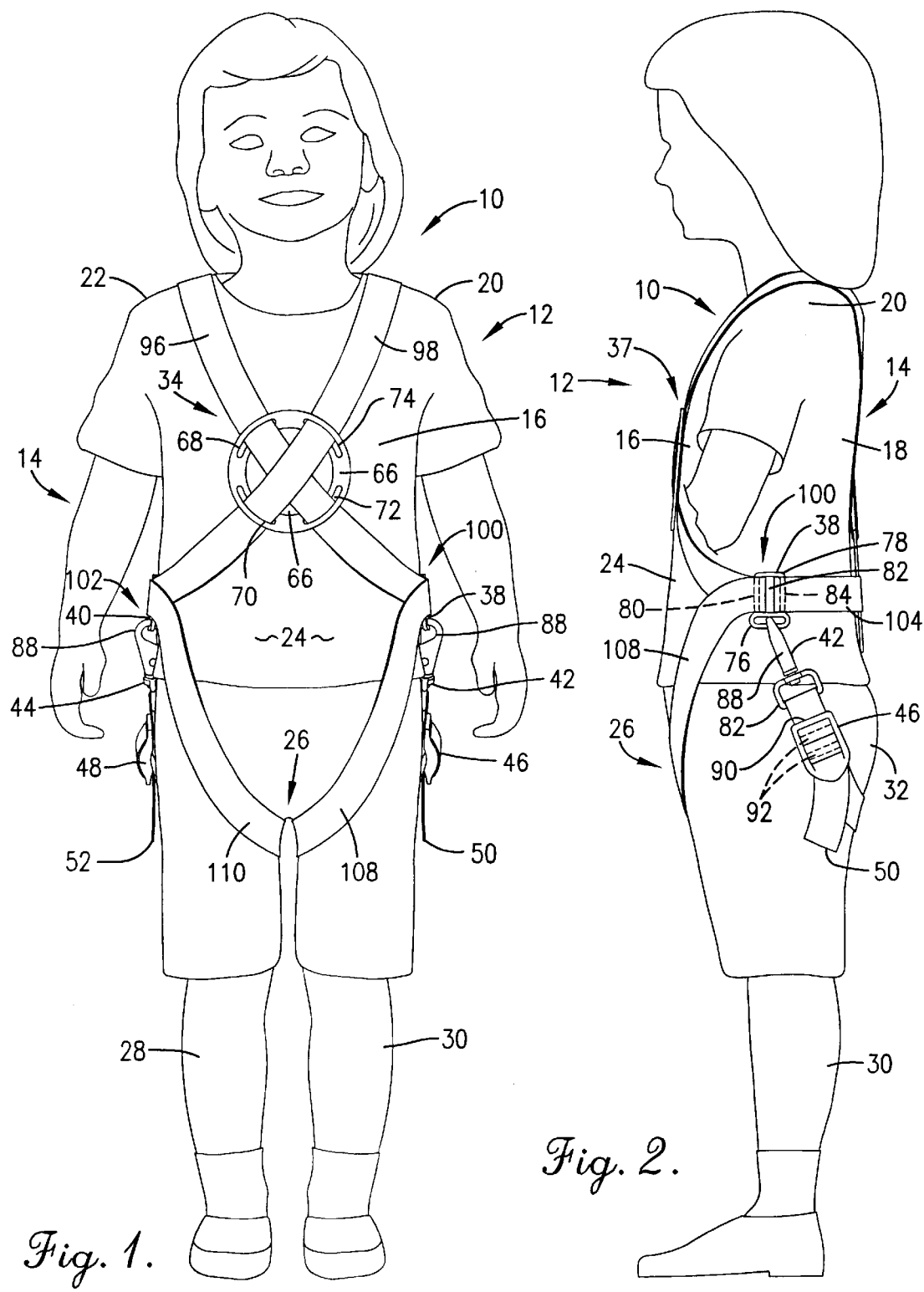
FIG. 1 is a front elevational view of a person wearing the preferred harness of the invention.
FIG. 2 is a fragmentary side elevational view of the person wearing the harness, with certain harness parts being depicted in phantom.

Turning now to the drawings, a preferred harness 10 in accordance with the invention is shown in FIGS. 1–3, worn by a person 12. The harness is designed to be worn on the person's trunk 14, the latter including a front 16 at the chest and stomach region of the person, a back 18, shoulders 20 and 22, waist 24, crotch 26 between the person's legs 28, 30, and buttocks 32. The harness 10 is preferably formed using only a single, unitary length of strap material 34 together with an anchor member 36, a slide fixture 37, side buckles 38, 40, endmost connector members 42, 44 and terminal adjustment buckles 46, 48.

In more detail, material 34 is preferably formed of conventional nylon or other similar high strength web or strap material and has a pair of ends 50, 52. Between the ends 50, 52, the strap 34 has no discontinuities or breaks. However, if desired, the harness 10 can be formed using individual sewn-together or otherwise attached strap segments as will be further described.

The anchor member 36 is a thin, preferably circular synthetic resin body 54 presenting a periphery and a central opening 56. As best seen in FIGS. 3 and 4, the body 52 has three arcuate, spaced apart slots 58, 60, 62 formed therein. The anchor member is designed to be positioned adjacent either the front 16 or back 18 of the person 12.

Fixture 37 is likewise in the form of a synthetic resin, preferably circular body 64 presenting a central opening 66 and four arcuate, circumferentially spaced slots 68 70, 72, 74 formed in the body periphery. The fixture 34 is usually located on the opposite side of the person's trunk relative to anchor member 36, and at about the same height of the latter.

The side buckles 38 and 40 are identical and each includes (see FIG. 2) a lower, horizontally extending connector loop 76 as well as an upstanding buckle connector 78 presenting three spaced apart legs 80, 82, 84. The connector members 42 and 44 are likewise identical and include a lower connection loop 86 together with a spring loaded connection swivel 88. Finally, the adjustment buckles 46, 48 are of unitary synthetic resin construction and have three parallel crosspieces 90, 92, 94.

Although the strap 34 is preferably of unitary construction, it effectively presents a series of operatively interconnected segments with the anchor member 36, fixture 37, side buckles 38, 40, connection members 42–44 and adjustment buckles 46–48. In particular, and referring first to FIG. 3, it will be observed that the anchor member 36 is preferably positioned near the small of the person's back 18 with the slot 58 uppermost. The strap 34 is threaded through the slot 58 to present first and second strap segments 96, 98 which extend upwardly and across the shoulders 22, 20 of the person 12 and thence downwardly in a crossing relationship until the crossed segments 96, 98 reach respective juncture regions 100, 102 on opposite sides of the person's trunk 14, usually near the waist 24. Advantageously, the segments 96, 98 are preferably sewn together (but not necessarily) by stitching 99 just above anchor member 36 (FIG. 3). As illustrated in FIGS. 1 and 4, the crossed segments 96, 98 pass through the fixture 37. In particular, the segment 96 passes through opposed slots 68, 72, whereas the segment 98 passes through opposed slots 70, 74. The juncture regions 100, 102 are in part defined by the side buckles 38, 40, inasmuch as the strap 34, is threaded through these side buckles.

The strap 34 is then threaded from the side buckles 38, 40 rearwardly to the anchor member 36 and is looped through the side slots 60, 62 (see FIG. 3). The continuous strap 34 is then returned from the slots 60, 62 back to and through the legs of the side buckles 38, 40; thus, these portions of the strap 34 between the buckles 38, 40 and anchor member 36 can be considered third and fourth strap segments 104 and 106.

The strap 34 is then extended from the side buckles 38, 40 downwardly through the front of crotch 26 and then through the crotch and upwardly adjacent the buttocks 32 to define fifth and sixth strap segments 108, 110. The segments 108, 110 are in turn threaded first through the legs of adjustment buckles 46, 48 and then through the connection loops 86 of the buckle connectors 78. After passing through the loops 86, the ends of the strap 34 are again threaded through the adjustment buckles 46, 48 to thereby present the strap ends 50, 52.

The harness 10 can readily be applied to a person by first passing the crossed first segments 96, 98 over the person's shoulders 20, 22 so that the anchor member 36 is positioned as shown in FIG. 3, with the fixture 37 adjacent the person's front. Thereupon, the fifth and sixth segments 108, 110 are passed through the crotch area 26 and rearwardly adjacent the buttocks 32. The attachment is completed by snapping the swivels 88 onto the connection loops 76 of side buckles 38, 40 (FIG. 2). Any needed adjustment can be effected by adjustment at the side buckles 38, 40 and at the terminal adjustment buckles 46, 48. In this way, the effective lengths of the six strap segments can be adjusted to achieve the proper fit.

As noted above, in the preferred embodiment, use is made of a continuous strap 34. However, if desired the strap segments can be separate and interconnected using conventional hardware for this purpose. In any case, the harness 10 provides a substantial measure of protection for a person, and allows the person to be securely connected to other safety equipment. For example, as shown in FIG. 3, the anchor member 36 has a central opening 56 sufficiently large to accommodate a standard safety belt 112. Thus, in the case of a child sitting on a parent's lap, the parent's safety belt can be threaded through the opening 56 so as to secure the child. Furthermore, as shown in FIG. 1, central opening 66 of slide fixture 37 is also sufficiently large to accommodate a safety belt, thus permitting a small child such as a newborn baby to be secured to an adult in a face-to-face arrangement. Alternately, an additional coupler 114 may be secured to the anchor member 36. As shown in FIG. 4, the coupler 114 includes a spring-loaded connection swivel 116 secured to the anchor member 36, and a loop-type strap coupler 118 is attached to the swivel. The loop coupler is sized to receive the standard safety belt 112 (see FIG. 5).

It will be appreciated that the coupler 118 allows the harness 10 to be used in a wide range of situations. For example, coupler 118 can be used as a "leash" for keeping a child close to his or her parent in stores or other environments which pose risks to an unsupervised child. Furthermore, the coupler 118 can be used as a safety mechanism for securing individuals working in heights. For example, the coupler 118 could be used to secure a window washer to a safety line to protect the washer in the event of a fall.

Although the preferred embodiment has been discussed with respect to securing child to an adult's lap by way of a seatbelt, it will be appreciated that the harness 10 also finds uses in other applications as well. For example, the harness 10 can be used to secure both children and adults in boats or on parade floats. Furthermore, the harness 10 can be used to secure a child to a seat at a table when a highchair is not available. The harness 10 is also useful for securing elderly people in a wheelchair to prevent them from falling and being injured. Finally, although the foregoing hardware (e.g., buckles 38, 40, 46, 48 member 36, fixture 37, members 42, 44) have been described as being formed of a synthetic resin material, it will be appreciated that any other high strength material (e.g., metal) could be used as well.

We claim:

1. A harness adapted to be worn on a person's trunk presenting a front, back, shoulders, waist, crotch and buttocks, said harness comprising:

an anchor member having a slot therethrough and adapted to be placed adjacent either the person's trunk front or back;

first and second strap segments formed from a continuous stretch of strap material extending through said anchor member slot to extend upwardly therefrom over the person's shoulders and then downwardly in crossing relationship adjacent the other side of the person's trunk opposite the anchor member to respective juncture regions on opposite sides of the person's trunk;

third and fourth strap segments operatively coupled to said first and second strap segments at said juncture regions, said third and fourth strap segments extending to and operatively coupled with said anchor member; and fifth and sixth strap segments operatively coupled to said first and second strap segments at said respective juncture regions, said fifth and sixth strap segments extending downwardly through the person's crotch and then upwardly for connection thereof at said juncture regions.

2. A harness adapted to be worn on a person's trunk presenting a front, back, shoulders, waist, crotch and buttocks, said harness comprising:

an anchor member adapted to be placed adjacent either the person's trunk front or back;

first and second strap segments operatively coupled with said anchor member and extending upwardly therefrom over the person's shoulders and then downwardly in crossing relationship adjacent the other side of the person's trunk opposite the anchor member to respective juncture regions on opposite sides of the person's trunk;

third and fourth strap segments operatively coupled to said first and second strap segments at said juncture regions, said third and fourth strap segments extending to and operatively coupled with said anchor member; and fifth and sixth strap segments operatively coupled to said first and second strap segments at said respective juncture regions, said fifth and sixth strap segments extending downwardly through the person's crotch and then upwardly for connection thereof at said juncture regions, said first, second, third, fourth, fifth and sixth strap segments being a part of a continuous stretch of strap material.

3. The harness of claim 2, said anchor member having three spaced apart slots formed therein, said strap material extending through one of said anchor slots and upwardly across said shoulders and then downwardly to said juncture regions, each of said juncture regions comprising a buckle member mounted on said strap material, said strap material extending through said buckle member to and looping through second and third slots in said anchor member to define said third and fourth strap segments, said strap material looped through said anchor member extending back and through the respective buckle members and downwardly therefrom to define said fifth and sixth strap segments said fifth and sixth strap segments each having adjacent the end thereof a connector member, said connector member releasably secured to the adjacent buckle member.

4. The harness of claim 3, the ends of said strap member extending through an adjustment buckle allowing the continuous strap to be selectively adjusted to thereby alter the effective lengths of said first, second, third, fourth, fifth, and sixth strap segments.

5. The harness of claim 3, said anchor member comprising a body presenting a periphery and a central opening defined by the periphery, said anchor member slots formed in said body periphery.

6. The harness of claim 5, said body being generally circular in configuration, said central opening being sized to permit passage therethrough of a standard safety belt.

* * * * *